United States Patent [19]

Masetti

[11] Patent Number: 5,353,545
[45] Date of Patent: Oct. 11, 1994

[54] REVERSE, INVERSE FLY, HOOK AND METHOD OF TYING

[75] Inventor: Guiliano Masetti, Nairobi, Kenya

[73] Assignee: Green Mountain Sports Center, Inc., Eureka, Mont.

[21] Appl. No.: 86,327

[22] Filed: Jun. 30, 1993

Related U.S. Application Data

[63] Continuation-in-part of Ser. No. 915,437, Jul. 17, 1992, abandoned.

[51] Int. Cl.$^5$ .............................................. A01K 85/00
[52] U.S. Cl. .................... 43/42.25; 43/42.53; D22/128
[58] Field of Search ............... 43/42.25, 42.53; D22/128, 130, 132

[56] References Cited

U.S. PATENT DOCUMENTS

| D. 87,373 | 7/1932 | Weber | D22/128 |
|---|---|---|---|
| D. 145,109 | 6/1946 | Supulver | 43/42.25 |
| D. 145,879 | 11/1946 | Camp | D22/128 |
| D. 264,490 | 5/1982 | Anderson | D22/128 |
| 2,757,476 | 8/1956 | Pender | 43/42.25 |
| 2,814,148 | 11/1957 | Allen | 43/42.25 |
| 4,023,301 | 5/1977 | Warner | 43/42.25 |

FOREIGN PATENT DOCUMENTS 202923  8/1923  United Kingdom ............... 43/42.25

Primary Examiner—Kurt C. Rowan
Attorney, Agent, or Firm—Marger, Johnson, McCollom & Stolowitz

[57] ABSTRACT

A fishing fly, particularly of the dry fly variety, which orients itself when cast so that the point of the hook is naturally pointing upwards when the fly lands on the water (W). The fly is of a reverse and inverse design, having hackles (34) and wings (28) positioned on the curved shape portion of the hook (18), the wings directed tangentially along the shape portion at an angle to the spear of the hook (20). The dry fly is tied by winding the hackles axially around the shape portion of the hook so that the hackle fibers protrude radially in a plane generally parallel to the shank of the hook between the shank and spear of the hook. Preferably, the hook has a wide gape and an elliptical eye approximately coplanar to the shank and shape of the hook so that the eye can remain secured in a vise throughout the fly-tying process.

30 Claims, 5 Drawing Sheets

REVERSE, INVERSE FLY, HOOK AND METHOD OF TYING

RELATED APPLICATION DATA

This application is a continuation-in-part of commonly assigned copending application, U.S. Ser. No. 07/915,437 filed Jul. 17, 1992, entitled REVERSE, INVERSE FLY STRUCTURE AND METHOD OF TYING, now abandoned.

BACKGROUND OF THE INVENTION

This invention relates generally to fishing lures of the type generically known as fly fishing lures wherein the weight of the fishing line is primarily used in the placement and casting of the lure, and the lure is intended to represent an insect or similar natural fish bait. More particularly, the invention pertains to a design and method for making fly fishing lures that are supported on a water surface by the surface tension of the water, commonly known as dry flies.

Conventional flies, such as shown in U.S. Pat. No. 4,411,089, and as described in J. Edson Leonard, Flies (1950), pp. 1-9, are tied on a hook having an eye at one end for tying the fishing line leader. Typically, the hook has a substantially straight shank, which commences from the base of the eye, a curved portion known as the shape, which proceeds accurately from the end of the shank opposite the eye, and a spear portion or bite which has a point and can include a barb. Typically, as a result of the arcuate shape, the spear and the shank are substantially parallel and lie within the same plane, although the spear can be bent or offset to one side. The eye is generally oriented transversely, i.e., in a plane normal to the plane of the shank and shape of the hook. It can be parallel to the shank, or inclined towards or away from the point, depending upon the desired action of the hook.

Once the desired hook has been selected, common fly materials are fastened to the hook in a commonly known fashion (see Flies, pp. 32-42) to form the parts of a fly. These parts include all or most of the following: a tail, a body, a hackle, and wings, depending on the insect to be imitated. In some patterns, the tail or wings or both are omitted. All dry fly patterns, however, use hackles to help support the fly on the water surface.

Typically in a dry fly, such as a May fly imitation, wings are attached to the shank just behind the eye; a hackle is wound axially around the shank adjacent the wings so as to protrude radially normal to the shank; and body and tail material are tied on the shank between the wings and/or hackle and the shape of the hook. A head is usually formed adjacent the eye. Variations in dry fly design include Palmer, with hackle wound fore and aft around the shank, and parachute hackle arrangements, wherein hackle is wound around a wing positioned near the hook eye. A reverse fly design is also known, in which the fly is arranged with the tail protruding forward around the eye of the hook, the hackle wound axially around the shank adjacent the shape, and wings positioned on the shank among the hackles and directed oppositely of the bend of the hook.

There are two common procedures for fastening the fly tying materials to the hook. The first technique begins by tying a silk thread to the shank near the eye and winding thread rearward along the shank to the beginning of the shape, which is usually held in a vise. The tail, commonly made of hackle quill, is then secured to the end of the shank along with the body material, which typically consists of silk floss, fur, peacock hurl or quill or a variety of other materials. The thread is then advanced toward the eye, and the body material is wrapped around the shank toward the eye. The body is then tied off with the thread. The wings and hackle are then secured to the shank just behind the eye. The hackle is wrapped axially around the shank so that the hackle fibers extend radially out from the shank. Finally, the hackle is tied off, typically with a whip finisher, to knot the thread and create the illusion of a head.

The second technique begins by securing the thread to the middle of the shank and winding the thread towards the eye. Wings are then mounted on the shank and secured to the shank by winding thread around the wing and the shank. A drop of cement is then placed on the thread and allowed to dry until tacky, and then the stem of a hackle feather is placed on the cement. The thread is then wound around the hackle several times. The thread is then wound along the shank rearward from the eye to the beginning of the shape. At this point, the tail is attached, using the thread, so that the tail is oriented away from and colinear to the shank. Next, the body is wrapped along the length of the shank, moving from the shape toward the eye, secured to the shank with thread at both ends. The hackle is then wound axially around the shank behind and in front of the wings. After the hackle has been wound, the hackle is secured to the shank with several windings of silk and a drop of cement. The resulting fly has its "head" near the eye of the hook, and its "tail" at the other end of the shank. The fly also has developed a particular orientation, which has the wings on "top" of the fly and the point is on the "bottom", i.e., the shank is between the wings and the point.

One limitation to the aforementioned fly design is due to the point orientation with respect to the rest of the fly. Because the point is beneath the shank, in the fly's natural orientation, the point of the hook penetrates the surface film, as illustrated in FIG. 10. The fly is more easily wetted, inhibiting floatability, and the hook can snag on material as it moves through the water. This is especially true when the fly is of the wet-type, which moves under the surface of the water but also occurs with dry flies. A variety of "weedless" or inverted flies, like that discussed in U.S. Pat. No. 3,690,029, attempt to resolve this problem by changing the natural orientation of the hook, with respect to the body of the fly, so that the shank of the hook lies beneath the barb. This is accomplished through the use of a special angular hook with a shank that is not straight but is angled so that the center of gravity of the fly lies below the fly material. This helps to maintain the spear of the hook pointed "upwardly," away from any objects on the stream beds. However, when this technique is applied to dry flies, "there is a tendency for dry flies not to maintain the desired vertical orientation . . . and additional orientation means are desirable." In addition, for economic reasons, as well as to use thin hook wire for lightness, what is desired is for the fly to use standard straight-shanked hooks, rather than the angled-shank hooks described in the aforementioned patent. The weedless variety of flies also changes the natural orientation of the hook, at the expense of exposing a portion of the hook so that it can break the surface film. This is undesirable in dry flies.

The so-called reverse fly design has the hackles and wings secured at the end of the shank opposite the eye, so that the hackles extend radially from the shank where the shank meets the shape, and the tail is secured to the eye of the hook. The fly is constructed in the same manner as the standard fly described above. The resulting fly has the point of the hook concealed in the hackles but, in practice, this design is unbalanced and lacks stability, tending to roll on the water. Also, this design is not very floatable. In commercially-available patterns of this design, called Stealth flies, the turned-down eye penetrates the surface film. Consequently, although long known, reverse flies have not achieved acceptance.

Another factor determinative of the commercial success of a fly is its ease of manufacturability, i.e., the complexity of tying the fly. The more difficult and, thus, the more time-consuming the fly is to tie, the higher the cost of the resulting fly to account for the increased labor cost.

Typically, flies are tied while secured in a vise that clamps the shape and point of the hook. One of the more time-consuming aspects of tying the fly is changing the position of the hook in the vise to provide better access to a portion of the hook. The location of the material on the fly limits the areas that the vise can clamp to those areas not covered with material. Attempts to secure the hook in the vise at a single position while the fly is being tied have, traditionally, consumed additional time because the fly is held at an awkward angle, making fly-tying even more difficult. This difficulty is only partly alleviated by using an articulating fly-tying vise, and remains a concern in the design of new fly patterns for commercial production.

Accordingly, a need remains for a design of an artificial fly, suitable for dry flies, which is highly floatable, stable, and conceals the hook. In addition, the design and method of tying such a fly should make it easy to tie, and preferably permit the fly to remain clamped in one position while being tied.

SUMMARY OF THE INVENTION

Therefore, an object of the invention is to design a dry fly which is more floatable and better balanced than prior designs.

A further object of the invention is to design said fly using a hook having a non-angular shank.

The invention is a fly design, particularly useful in dry flies, which orients itself so that the barb of the hook is naturally pointing upward when the fly lands on the water. In general, the fly design of the present invention is both a reverse and inverse design, having hackles positioned on the bend or shape portion of the hook. Wings, if used as is preferred, are tied tangentially along the shape portion near the spear portion and are preferably directed generally toward or at an angle to the point, rather than oppositely directed as in conventional flies and reverse flies. This orientation not only helps to prevent snagging of the fly on debris by orienting the point upward, but also helps ensure that the barb of the hook sets properly in the fish's upper jaw.

The concepts of the invention are most applicable to dry flies but could be used in wet flies. The inventive concept may be utilized in a wide variety of fly patterns using many types of fly materials, hooks and configurations.

Another aspect of the invention is the method of making the fly with the aforementioned attributes. A dry fly according to the invention is best tied by winding the hackles axially around the bend or shape portion of the hook so that the hackle fibers protrude radially in a plane generally parallel to the shank of the hook, between the shank and spear of the hook. Wings, if used as preferred, are preferably tied on tangentially along the shape portion of the hook so as to protrude past the base of the spear. The method can include securing the hackle, and wings if so desired, to the shape of the hook; attaching the body to the shank of the hook; and finally, attaching the tail to the end of the shank in proximity to the eye of the hook.

A further aspect of the invention is a hook design having the eye oriented in substantially the same plane as the shank and shape of the hook. This feature enables the hook to be in a vise at the eye of the hook while the fly is tied. Preferably, the shape of the hook is formed with a gape that is wide relative to overall hook size to facilitate winding hackle onto the shape portion of the hook.

The foregoing and other objects, features and advantages of the invention will become more readily apparent from the following detailed description of a preferred embodiment of the invention which proceeds with reference to the accompanying drawings.

DETAILED DESCRIPTION

Figure 1:
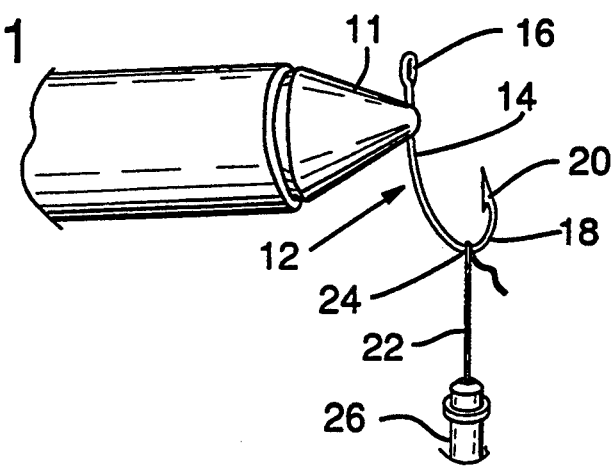
FIG. 1 is a side elevation view showing a hook secured along its shank in the mouth of a fly-tying vise with a silk tying thread tied to the shape of the hook in a first step of a first method of tying a reverse-inverse dry fly in accordance with the invention.

Referring to FIG. 1, a first method of tying a reverse-inverse dry fly 10 (FIGS. 7-9) according to the invention commences by mounting a hook 12 in the jaws 11 of a conventional fly-tying vise. The hook is positioned initially with its shank 14 oriented vertically and secured between the jaws of the vise near the eye 16 of the hook. The eye 16 is positioned above the jaws of the vise and the shape portion 18 extends below the jaws of the vise with the spear and point 20 of the hook directed upward. Alternatively, the hook can be initially oriented vertically with the shape portion 18 extending above the jaws of the vise and its eye 16 directed downward.

Figure 11:
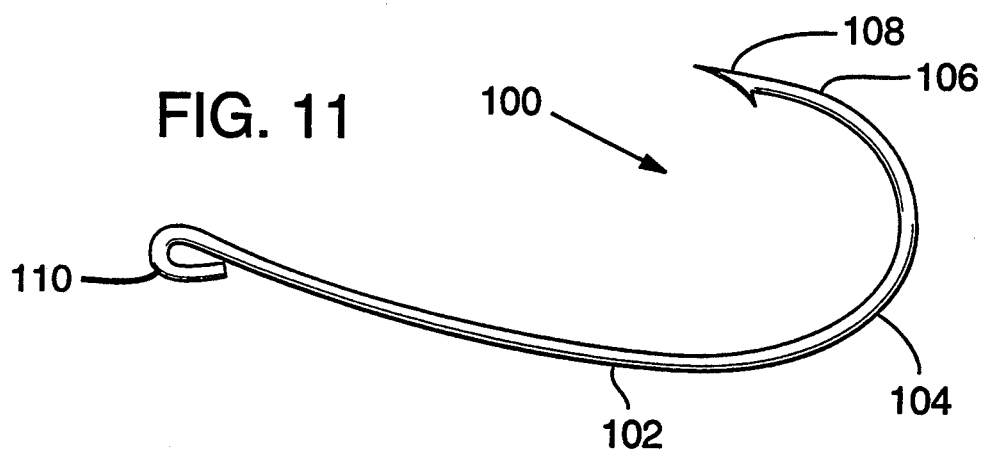
FIG. 11 is a side elevation view of a hook having an elliptical eye approximately coplanar with the shank and curved shape of the hook, and the eye positioned on a side of the shank opposite the curved shape of the hook.

The hook is preferably of a type having its eye 16 extending parallel to the shank 14, although an angled-eye hook can be used. Alternatively, a hook can be used which has its eye oriented in the same plane as the shank and shape of the hook, perpendicular to the orientation of eye 16 in FIG. 1, and positioned either above or below the shank as further described below with reference to FIG. 11. The shank 16 is non-angular, in contrast to the angular hooks described in U.S. Pat. No. 3,690,029. The shank 16 preferably has a slight curvature but can be substantially straight as shown in FIG. 11.

Tying thread 22 is tied by means of a knot or hitch 24 onto the shape 18 of the hook at about its lowermost point in FIG. 1 (midway between shank 14 and spear 20), and is tensioned by a conventional bobbin 26.

Figure 2:
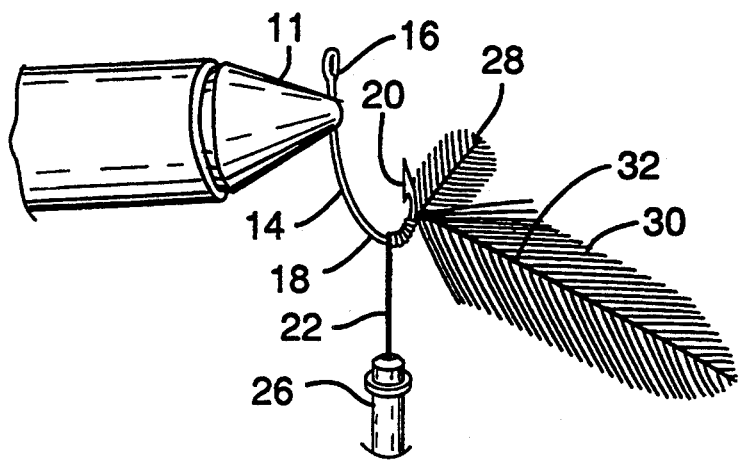
FIG. 2 is a view like FIG. 1 showing the hook with hackle and wings attached to the shape portion of the hook.

Moving to FIG. 2, a pair of wings 28 (only one appears in side view) is tied onto the hook tangentially along the shape portion 18 nearer to the spear than to the shank and oriented in a direction opposite the shank, i.e., in generally the same direction as the shape portion. This is done by tying the base of the wings to the shape of the hook and wrapping the tying thread from knot 24, a short distance along a lower portion of the shape 18 toward the spear 20.

The wings 28 are formed of any suitable wing material, conventionally including hackle tips as shown in the drawing or mallard quill, cul de canard, hair, artificial wing, etc. They can be positioned in any of an upright, spent-wing or other fashion suitable to the insect being imitated, as is well known. In general, the wings extend from a position at the base of the spear 20 of the hook at an angle determined by the curvature of the shape at the base and how far toward the spear that the tying thread is wrapped around the wing material. In the example shown in side elevation view in FIGS. 2-7, the wings are positioned at an acute angle to the spear 20 and are spread in the top views of FIGS. 8 and 9. The wing angle relative to spear and the spread relative to the shank can be freely varied to suit the intended imitation.

Figure 3:
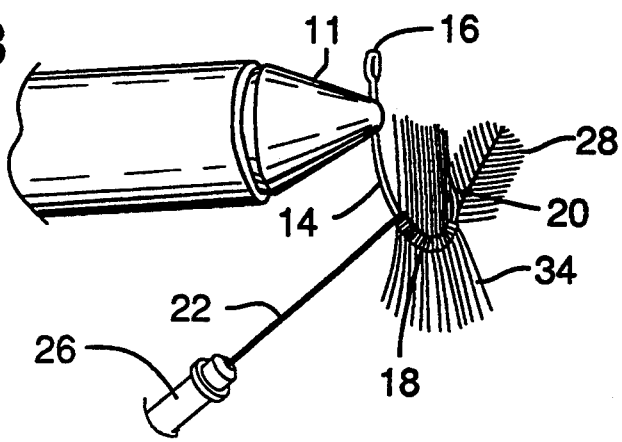
FIG. 3 is a view like FIG. 2 showing the hackle wrapped around the shape portion of the hook and tied off.

Next, a hackle feather 30 is secured to the shape of the hook adjoining the wing, using the tying to secure the stem 32 of the hackle. Referring to FIG. 3, the hackle is wound axially along the shape 18 from the wing toward the shank of the hook and tied off preferably with a whip finisher. Thus wound, the hackle fibers protrude radially outward from the shape portion of the hook in a plane that is generally parallel to the shank 14, rather than normal to the shank as in the prior art and that is between the shank and the spear 20.

Figure 4:
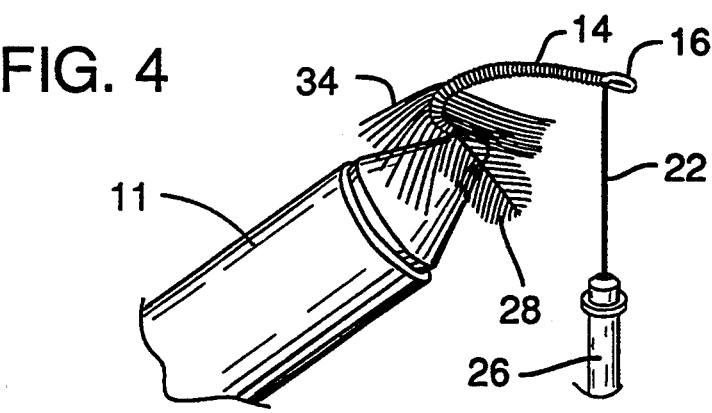
FIG. 4 is a side elevation view showing the hook repositioned in the vise and the tying thread wrapped around the hook along the shank to the eye.
Figure 5:
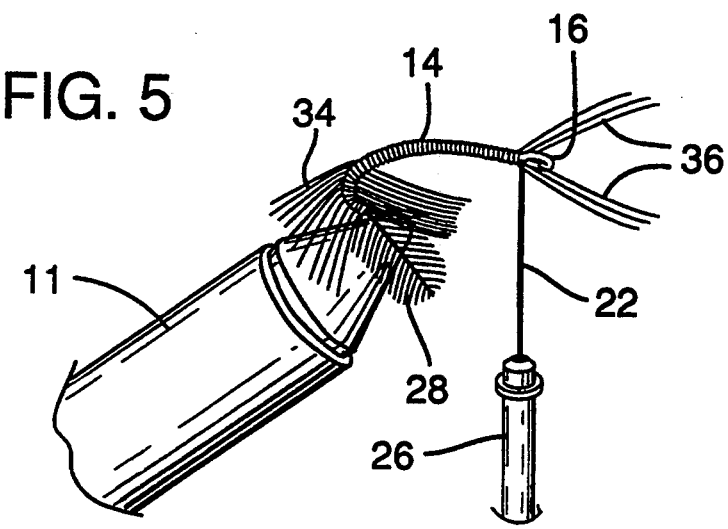
FIG. 5 is a view like FIG. 4 showing a tail secured to the shank of the hook adjacent the eye with the thread.

In the steps shown in FIG. 4, the hook is repositioned with the spear secured in the jaws of the vise, similar to the manner that is customary for tying conventional flies. Then, the tying thread is wrapped along the shank 14 toward the eye 16. Moving to FIG. 5, hackle fibers, hairs or other suitable tail material are tied onto the shank in position to protrude lengthwise of the shank past the eye to form a tail 36. The tail may be split as shown to imitate a May fly tail or may be bundled as in many common patterns.

Figure 6:
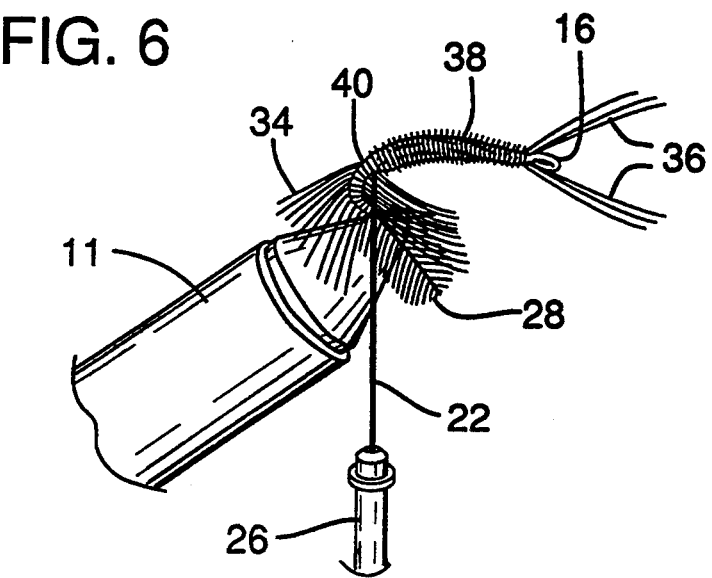
FIG. 6 is a view like FIG. 5 showing body material wrapped rearward along the shank of the hook from the eye to the hackle and tied off to finish the fly.

Finally, as shown in FIG. 6, a suitable body material 38, such as floss, hurl or quill is secured to the shank near the eye 16 and wound along the shank to the hackle at the transition point 40 between the shank and the shape of the hook, carrying or winding the tying thread along with it. The body material is tied off using a whip finisher to secure the material and thread to the shank. The remaining tying thread is severed and cement may be applied as is well known, thereby finishing the fly.

Figure 7:
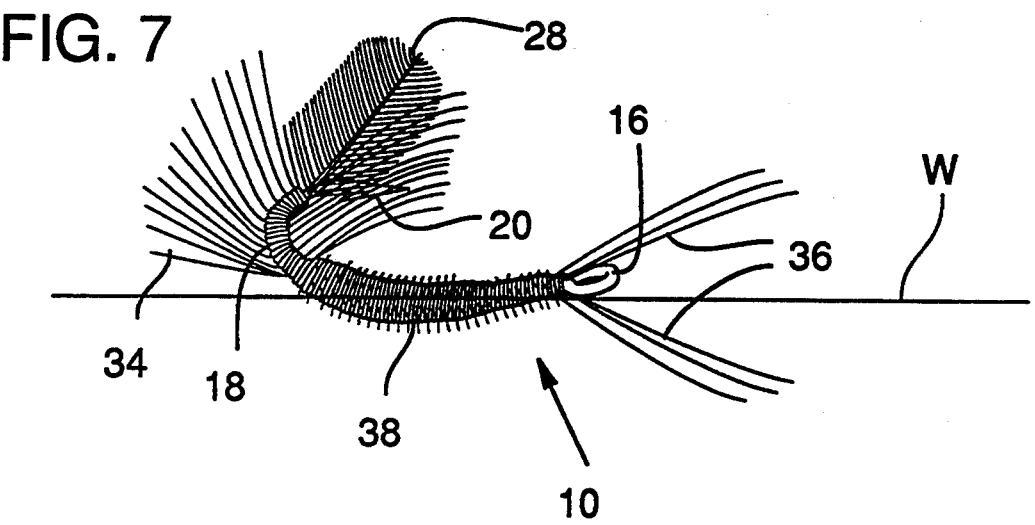
FIG. 7 is a side elevation view of the completed fly shown in the position which it normally assumes when cast on the surface film.
Figure 8:
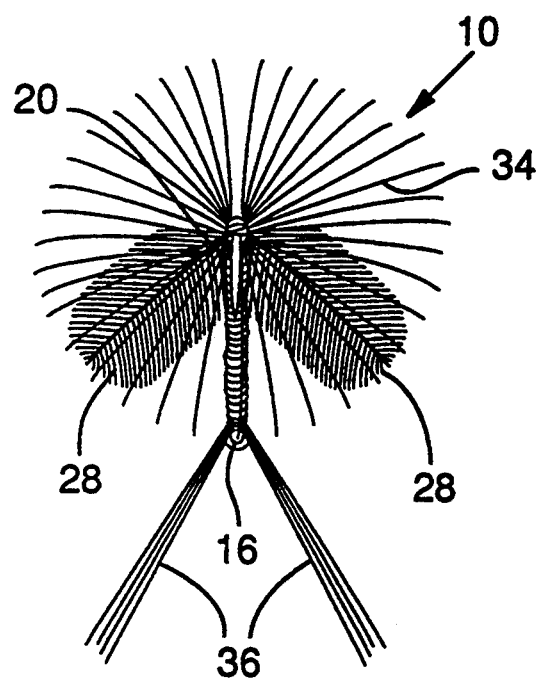
FIG. 8 is a top view of the fly of FIG. 7 showing the hackle fibers extending radially of the shape portion of the hook.

The resulting fly 10 is shown in FIGS. 7 and 8. In FIG. 7, the fly is shown in the position in which it usually alights on a water surface W when cast. Apparently, when the fly is cast through the air, the wings protruding from the shape portion of the hook adjacent the spear aerodynamically guide the fly into the illustrated position with the spear 20 superior to the shank. The point of the hook is supported in the air by hackles 20 and thus cannot penetrate the surface film W. Furthermore, the spear 20 is enclosed within the hackle fibers between the wings. A fish taking the fly in this orientation is usually hooked in the upper jaw.

Figure 9:
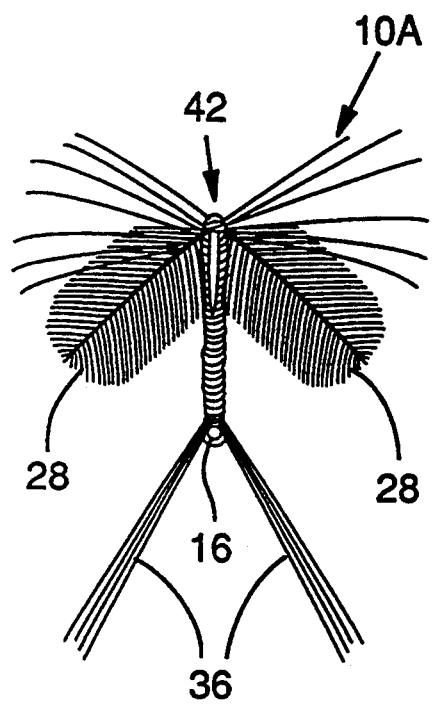
FIG. 9 is a top view like FIG. 8 showing the hackles optionally trimmed from the front and rear sides of the shape of the hook.
Figure 10:
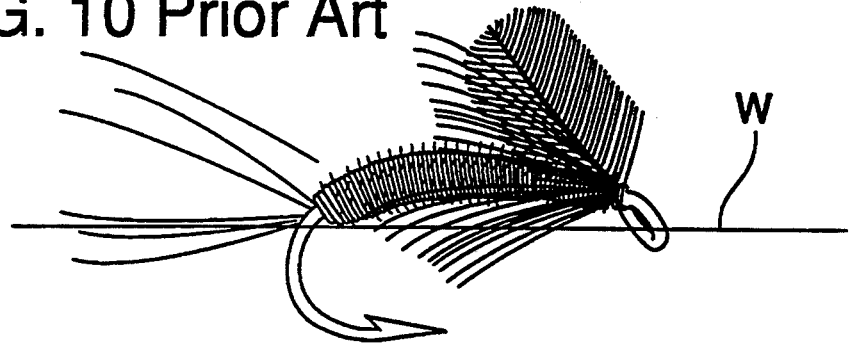
FIG. 10 is a side elevation view of a prior design of a fly showing how the fly rests on the water.

The tail 36 and the hackle fibers 34 protruding radially from the shape 18 of the hook in a plane parallel to the water surface W form a broad platform to support the fly on the surface film. This arrangement provides a larger area of hackle fibers to support the fly than does the conventional fly design, in which the hackle fibers protrude radially from the shank, as shown in FIG. 10. The arrangement of the present invention more realistically imitates many insects which splay their legs outward when resting on the water surface. Optionally, as shown in FIG. 9, the hackle fibers in the area behind the shape portion of the hook can be trimmed to enhance the realism of the imitation.

Figure 11A:
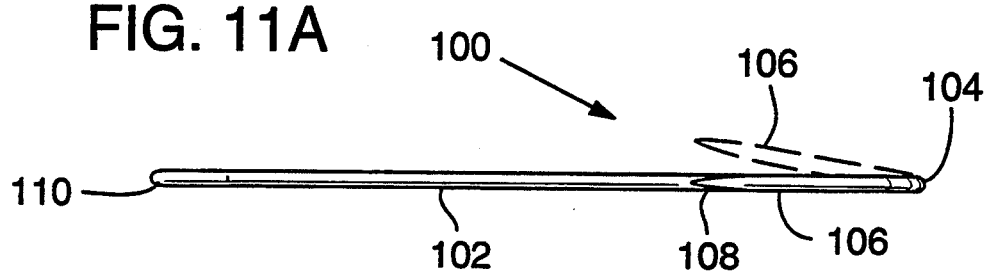
FIG. 11A is a top plan view of the hook of FIG. 11 showing an alternative, offset point in dashed lines.

Referring now to FIG. 11 and FIG. 11A, a preferred hook 100 is shown proportioned to scale, that allows the fly described herein to be tied while securing the hook at a single position in a vise 112 (FIGS. 12-17). The hook 100 is made of standard wire (e.g., 0.40 mm.) and is highly tempered for stiffness. It includes a shank 102 having a first end and a second end. The shank 102 is preferably short relative to overall hook size, with a slight curvature along its length. The shank 102, however, has no abrupt angles. Connected to the second end of the shank 102 is a curved shape portion 104. The shape portion 104 is approximately semicircular and preferably lies in the same plane as the shank 102. Alternatively, the point can be bent or offset to one side so that it does not lie in the plane of the curved shape portion of the hook as shown in FIG. 11A. The curved shape portion 104, in the preferred embodiment, is between a sproat and a perfect bend to give the shape portion 104 an arcuate length sufficient to permit hackle and wing placement thereon.

Connected to the shape portion 104 is a spear portion 106 that is oriented generally parallel to the shank 102. A point 108 is formed at the distal end of the spear 106. In the preferred embodiment, the point 108 is a small barb chisel point with the point being located outside of the bend. A barbless hook can also be formed according to the invention. In the preferred embodiment, the spear 106 points slightly away from the shank 102. The shape portion is formed with a wide gape between the shank 102 and the spear 106. The wide gape and a slight outbend of the point allows a fish to be secured on the hook despite the hackle being wound axially around the shape portion 104 to form a radial pattern of hackle fibers, as shown in FIG. 8.

Connected to the first end of the shank 102 is an eye 110 for securing a fishing line to the hook. The eye is forged flat so as to be oriented in a plane approximately coplanar with the shank 102 and the shape 104. The eye is positioned on the side of the shank 102 opposite the spear 106. In the preferred embodiment, the eye is tear drop or elliptically shaped to provide a maximum surface area for a vise to clamp onto, although a circularly shaped eye can also be used.

Figure 12:
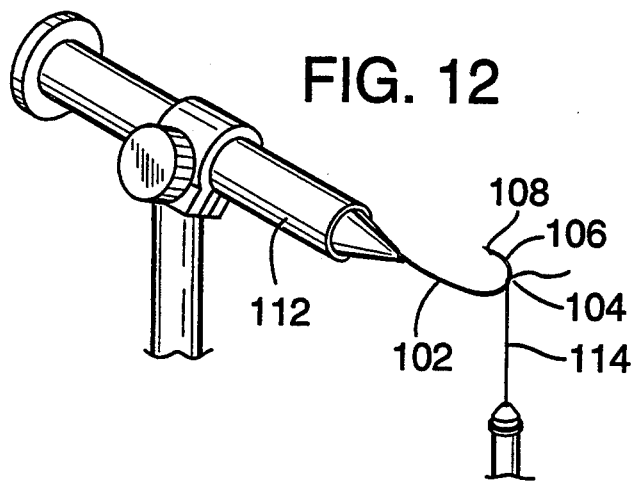
FIG. 12 is a side elevation view showing the hook of FIG. 11 secured at the eye of the hook in a fly-tying vise with a tying thread tied to the shape portion of the hook in a first step of a second method of tying a reverse-inverse dry fly in accordance with the invention.
Figure 13:
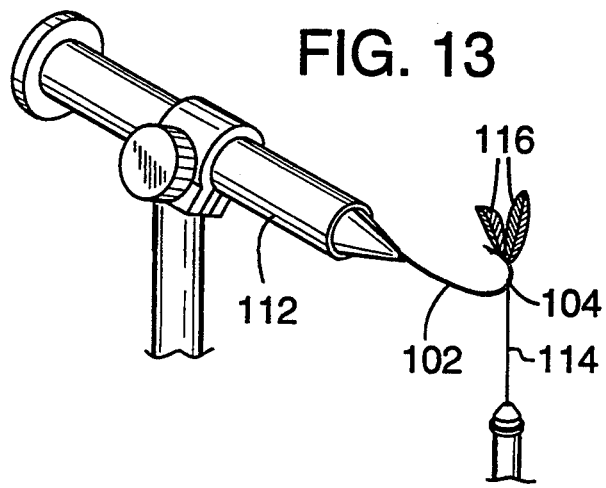
FIG. 13 is a view like FIG. 12 showing the hook with wings attached to the shape portion near the spear portion of the hook.

Referring to FIG. 12, a second method of tying a reverse, inverse dry fly according to the invention commences by mounting the hook 100 of FIG. 11 in the jaws of a conventional articulating vise 112. The hook is secured in the vise at the eye 110 such that the spear 106 is superior to the shank 102. The head of the vise is tilted downward at about a 30 degree angle. Tying thread 114 is tied by means of a knot or hitch onto the shape 104 of the hook approximately midway between the shank 102 and spear 106. Moving to FIG. 13, a pair of wings 116 is tied onto the hook tangentially along the shape 104 and oriented in a direction opposite the shank 102, i.e., in generally the same direction as the shape 104. The wings 116 are attached by wrapping the thread 114 around the base of the wings and the shape portion 104 near the spear 106.

Figure 14:
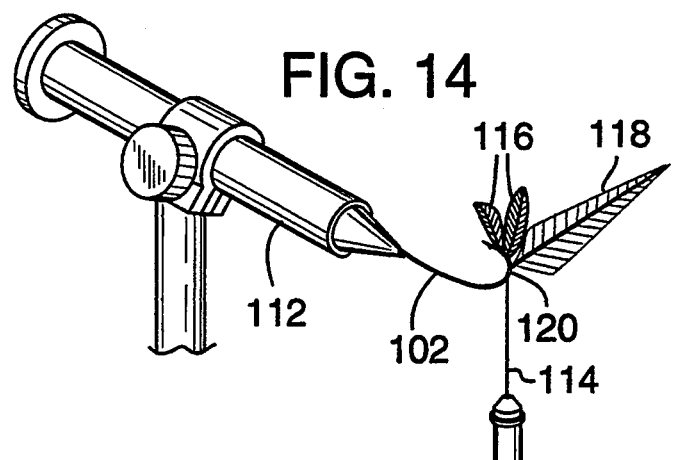
FIG. 14 is a view like FIG. 13 showing the hackle attached to the shape of the hook.

Next, referring to FIG. 14, a hackle feather 118 is secured to the shape of the hook adjoining the wing. The hackle is secured to the shape in a manner similar to that used to secure the wings 116. Thread 114 is wound around the stem of the hackle 120 and around the shape of the hook 104 to secure the base of the hackle to the shape.

Figure 15:
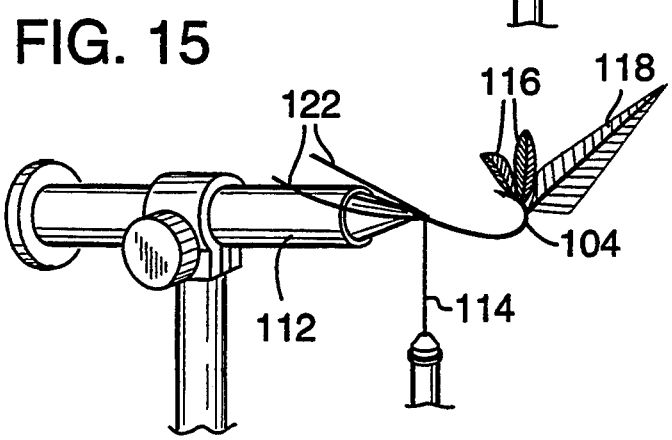
FIG. 15 is a view like FIG. 14 showing the vise repositioned and the tail attached to the shank of the hook adjacent the eye.

Referring now to FIG. 15, thread 114 is wound around the shank 102 to a position near the eye, where tail 122 is then attached. The tail is oriented generally collinear to the shank 102 or splayed out to imitate a May fly tail, and is attached by winding thread 114 around the shank and the base of the tail material near the eye.

Figure 16:
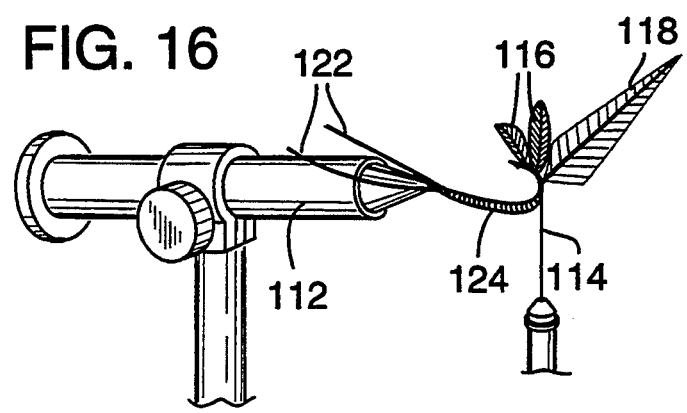
FIG. 16 is a view like FIG. 15 showing body material wrapped rearward along the shank of the hook from the eye to the shape.

Next, referring to FIG. 16, the vise head is repositioned horizontally. Then a suitable body material 124 is wrapped along the shank 102 from near the eye to the shape near where the hackle feather 118 is attached. The precise type and position of the body material 124 can vary according to the type of fly being constructed.

Figure 17:
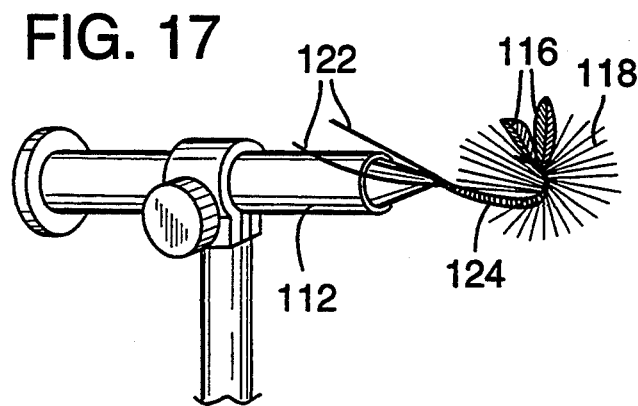
FIG. 17 is a view like FIG. 16 showing the hackle wrapped around the shape portion of the hook and tied off.

The final step shown in FIG. 17 includes winding hackle 118 axially around the shape portion 104. The hackle fibers protrude radially outward from the shape portion of the hook in a plane that is generally parallel to the shank 102 and is between the shank and the spear. Thread 114 (not shown in FIG. 17) is tied off preferably with a whip-finisher.

Thus, in the second method of tying the reverse, inverse dry fly shown in FIGS. 12–17, the eye of the hook remains secured in the vise throughout the entire tying process. This eliminates the time consuming step of changing the position of the hook in the vise and therefore reduces the overall time required to tie the reverse, inverse dry fly.

Having described and illustrated the principles of the invention in a preferred embodiment thereof, it should be apparent that the invention can be modified in arrangement and detail without departing from such principles. The disclosed design and method can be used to make many patterns of flies, wet as well as dry, with and without wings or tail, and using virtually all of the materials conventionally used in fly tying. In addition, the precise sequence used to attach the fly material to the hook can also be changed. I claim all modifications and variation coming within the spirit and scope of the following claims.

I claim:

1. A fishing fly comprising:
    a hook having a shank, an eye at a first end of the shank, a curved shape portion at a second end of the shank opposite the eye, and a spear connected to the shape portion and having a point directed generally parallel to the shank; and
    a hackle wound axially around the shape portion of the hook to form a radial pattern of hackle fibers protruding outward from a segment of the shape portion of the hook extending at least from a point midway between the shank and the spear toward the spear.

2. A fishing fly according to claim 1 including a wing attached to the shape portion between the shank and the spear so as to extend away from the shank.

3. A fishing fly according to claim 2 in which the wing is positioned tangentially on the shape portion at a perpendicular to acute angle to the spear of the hook.

4. A fishing fly according to claim 1 including a tail connected to the first end of the shank and extending past the eye of the hook.

5. A fishing fly according to claim 4 in which the eye is aligned parallel to the shank.

6. A fishing fly according to claim 1 in which the eye is oriented in a plane approximately coplanar with the shank and the shape.

7. A fishing hook according to claim 6 wherein the shape of the eye is elliptical.

8. A fishing hook according to claim 6 wherein the eye is located on the side of the shank opposite the spear.

9. A fishing hook according to claim 6 wherein the shape of the hook separates the shank from the spear to form a wide gape.

10. A fishing hook according to claim 6 wherein the shank is curved inward towards the spear.

11. A fishing hook according to claim 6 wherein the point does not lie in a plane with the curved shape portion.

12. A method for tying a fly on a hook which includes a shank, an eye connected to a first end of the shank, a curved shape portion connected to a second end of the shank, and a spear connected to the shape portion in an approximately parallel relationship to the shank, the method comprising:

winding a hackle around a segment of the shape portion of the hook extending from a point nearer to the spear than the shank to at least midway between the spear and the shank;

attaching a tail to the first end of the shank adjacent to the eye; and forming a body along the shank of the hook between the tail and the hackle.

13. A method for tying a fly according to claim 12 wherein winding the hackle includes:

tying a piece of thread to said shape portion between the shank and the spear of the hook;

wrapping the hackle around said segment of the shape portion of the hook so as to create a plane of hackle fibers extending radially from said segment of the shape portion, in a plane spaced between and oriented generally parallel to the shank and the spear of the hook; and wrapping the thread around an end of the hackle so as to secure the hackle to the hook.

14. A method for tying a fly according to claim 12 including attaching a set of wings to said shape portion of the hook at a predetermined position spaced from the shank toward the spear.

15. A method for tying a fly on a hook according to claim 14 wherein attaching a set of wings to said shape portion includes:

positioning a base portion of wing along the shape portion of the hook;

orienting the wing so as to extend in a direction away from the shape portion and at an angle to the spear of the hook to steer the fly when cast to position the spear above a water surface; and wrapping the thread around said base portion and the shape portion of the hook so as to secure said wing to the hook.

16. A method for tying a fly on a hook according to claim 14 wherein attaching a set of wings to said shape includes:

positioning a base portion of a wing tangentially along the shape of the hook;

orienting the wing so as to extend in a direction away from the shank and generally toward the spear of the hook; and wrapping the thread around said base portion and the shape of the hook so as to secure said wing to the hook.

17. A method for tying a fly according to claim 12 wherein forming a body along the shank of the hook between where the tail is attached and where the hackle is attached includes:

attaching one end of a selected body material to said shank near the eye by wrapping a piece of thread around said end;

wrapping the body material around the shank from the eye to a location at which the hackle is attached to the shape portion; and securing said body material to the hook at said location by wrapping the thread around a terminal end of the body material.

18. A method for tying a fly according to claim 12 further comprising:

forming the eye of the hook to lie approximately coplanarly with the curved shape portion of the hook; and securing the eye of the hook in a fly tying vise with the spear positioned superior to the shank.

19. A method for tying a fly according to claim 18 wherein the hook remains secured in the vise at the eye of the hook throughout said steps.

20. A method for tying a fly according to claim 12 including attaching a tail to the first end of the shank adjacent to the eye.

21. A fishing fly comprising:

a hook having a non-angular shank, an eye at a first end of the shank, a curved shape portion at a second end of the shank opposite the eye, and a spear connected to the shape portion and having a point directed generally parallel to the shank; and a wing attached to a segment of the shape portion located midway between the shank and the spear and directed toward the spear so that the wing extends away from the shank at an angle to the spear.

22. A fishing fly according to claim 21 in which the wing includes two wings positioned symmetrically about a plane defined by the shank and the shape portion of the hook.

23. A fishing fly according to claim 21 including a hackle wound axially around the shape portion of the hook.

24. A fishing fly comprising:

a hook including a shank, an eye connected to a first end of said shank, a curved shape portion connected to a second end of the shank opposite the first end, and a spear connected to an end of the shape portion spaced from the shank;

a tail mounted on the first end of the shank adjacent to the eye;

a body formed on the shank;

a set of wings mounted on the shape portion of the hook; and a hackle wound on at least a segment of the shape portion of the hook extending from the spear to midway between the shank and the spear.

25. A fishing fly according to claim 24 in which the hook has a non-angular shank around which body material is wrapped from the first end adjacent the eye to the second end adjacent the shape portion and the hackle to form said body.

26. A fishing fly according to claim 24 in which the shape portion is curved so that the spear is substantially parallel to the shank, and the wings are mounted on the shape portion nearer the spear than to the shank in a direction extending away from the shape portion at an angle to the spear to steer the fly when cast so as to position the spear above a water surface.

27. A fishing fly comprising:

a hook having a shank, an eye at a first end of the shank, a curved shape portion at a second end of the shank opposite the eye, and a spear connected to the shape portion, the shape portion being curved so that the spear is generally parallel to the shank; and a wing mounted on the shape portion nearer the spear than to the shank and extending away from the shape portion at an angle to the spear to steer the fly when cast so as to position the spear above a water surface.

28. A fishing fly comprising:

a hook having a shank, an eye at a first end of the shank, a curved shape portion at a second end of the shank opposite the eye, and a spear connected to the shape portion and having a point directed generally parallel to the shank; and a hackle wound axially around the shape portion of the hook to form a radial pattern of hackle fibers protruding outward from the shape portion between the shank and the spear;

the hackle fibers protruding from the shape portion having a length at least as long as the spear of the hook so as to obscure the spear from view among the hackle fibers.

29. A fishing fly according to claim 28 further comprising a wing attached to the shape portion between the shank and the spear and directed toward the spear so that the wing extends away from the shank at an angle to the spear.

30. A fishing fly according to claim 29 wherein the wing extends away from the shank at an acute angle to the spear.

* * * * *